Dec. 7, 1965   C. G. B. BERGLING ETAL   3,221,867
CHAIN CONVEYOR

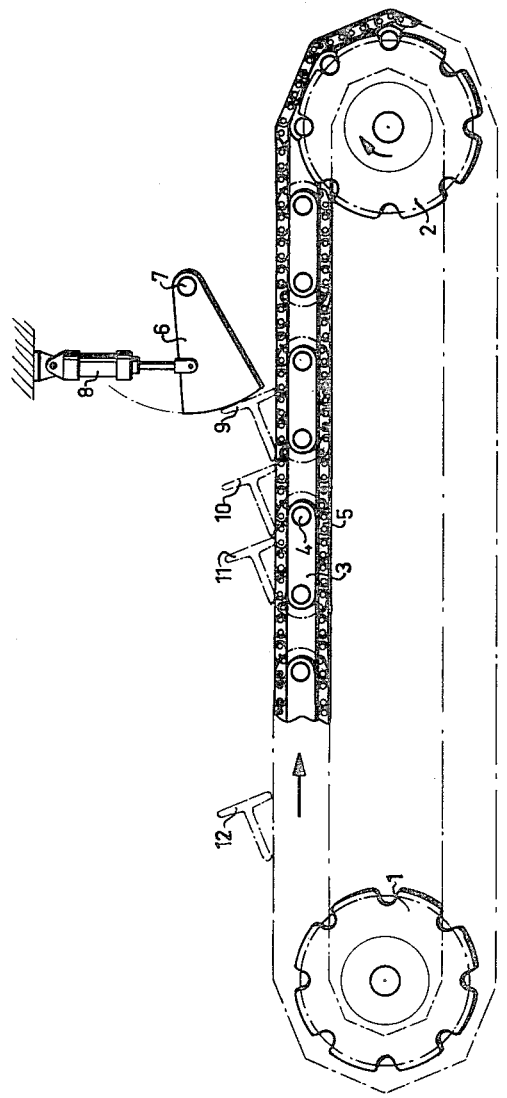

Filed Sept. 6, 1963                                    3 Sheets-Sheet 2

Dec. 7, 1965   C. G. B. BERGLING ETAL   3,221,867
CHAIN CONVEYOR

Filed Sept. 6, 1963   3 Sheets-Sheet 3

United States Patent Office 3,221,867
Patented Dec. 7, 1965

3,221,867
CHAIN CONVEYOR
Charles Gunnar Birger Bergling and Herman Nils Levin, Orebro, Sweden, assignors to Ingenjorsfirma Hebe Aktiebolag, Orebro, Sweden, a company of Sweden
Filed Sept. 6, 1963, Ser. No. 307,173
Claims priority, application Sweden, Sept. 7, 1962, 9,702/62
3 Claims. (Cl. 198—183)

The invention relates to a chain conveyor on which the articles being conveyed can be temporarily stored while the conveyor is still moving. The chain conveyor of the invention comprises at least one endless chain arranged for continual operation, and is characterized in that movable means in the form of endless smaller chains, so-called store chains, are mounted on the transport chain, said store chains being arranged to support the articles being conveyed so that said articles can be moved relative to the conveyor in its longitudinal direction, a stopping member being provided above the conveyor so that it can be placed in the way of the articles being conveyed, the articles when thus stopped being collected at the stopping member while the transport chain continues moving.

The movable means in the form of endless smaller chains will hereinbelow be referred to as store chains. At least one store chain is arranged between each pair of adjacent axles connecting the links of the transport chain. The upper portions of all store chains are situated in one plane. As the store chains overlap each other the upper surface of the transport chain consists entirely of a store chain. Therefore, articles of any shape can be transported on the chain conveyor.

Figure 3:
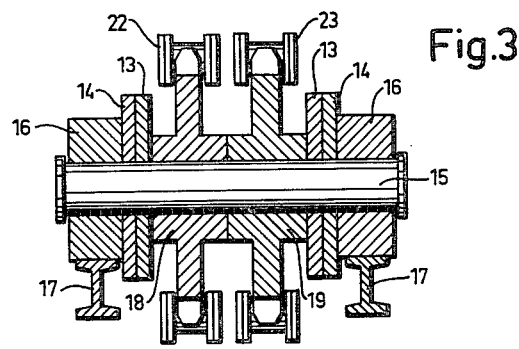
Figure 2:
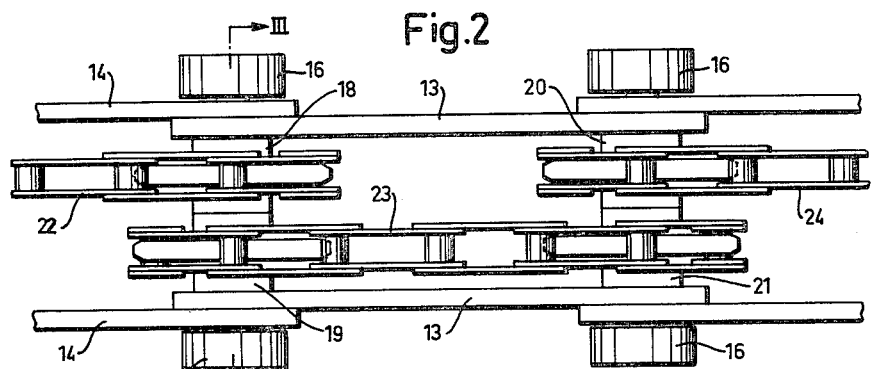
Figure 4:
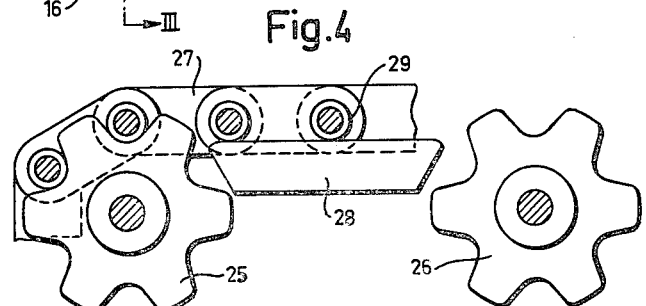
Figure 5:
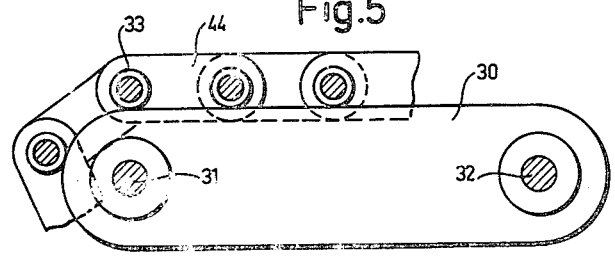
Figure 7:
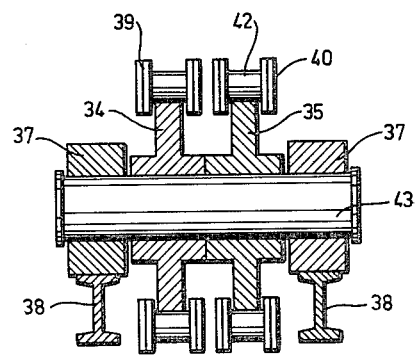
Figure 6:
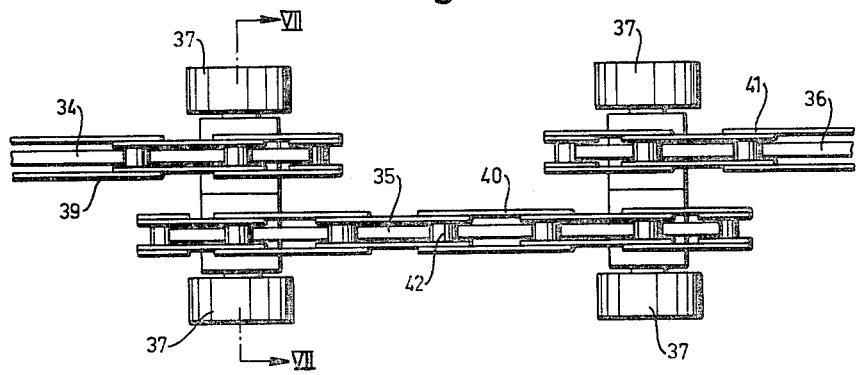

The invention will be explained hereinbelow with reference to the accompanying drawings. FIG. 1 shows an elevation of a chain conveyor according to the invention. FIGS. 2 and 3 show an embodiment of a transport chain with store chains, FIG. 2 showing the transport chain from above and FIG. 3 illustrating a section through line III—III in FIG. 2. FIGS. 4 and 5 illustrate two alternative ways of mounting the store chains on a transport chain of the type shown in FIGS. 2 and 3. FIGS. 6 and 7 show another embodiment of a transport chain with store chains, FIG. 6 illustrating the transport chain from above and FIG. 7 illustrating a section through line VII—VII in FIG. 6.

The device of FIG. 1 consists of two chain wheels 1 and 2 supporting an endless transport chain consisting of links 3 interconnected by axles 4. Store chains 5 are provided along the entire length of the transport chain, said store chains being mounted on the transport chain in a way described below, for instance. Above the transport chain there is provided a stopping member consisting of a plate 6 mounted on a horizontal pivot 7 and movable up and down by a hydraulic or pneumatic cylinder 8.

Iron articles 9–12 having T-profiles are being transported on the conveyor. The articles are placed upon the conveyor with a mutual distance equal to the distance between articles 11 and 12. If it is desired to stop temporarily the unloading of articles from the conveyor the stop plate 6 is lowered into the illustrated position while the transport chain is allowed to continue its movement in the direction of the arrow. The articles having been stopped by the stopping member pack on the transport chain as illustrated by profiles 9–11. The store chains passing temporarily below profiles 9–11 will be moved relative to the transport chain so that their upper portions will be stationary relative to the articles 9–11. Consequently, there will be no friction between the articles and the transport chain.

For conveying small articles one transport chain is sufficient. This chain can be designed to have any desired width, and each link of said chain can be designed to support two or more store chains side by side. When conveying elongated articles, such as the illustrated articles, it is preferred to arrange two or more synchronously operated transport chains side by side at the desired distance.

The transport chain shown in FIGS. 2 and 3 consists of links 13 and 14, interconnected by axles 15. Rollers 16 are pivoted on the ends of these axles and arranged to roll on supports 17 mounted below the upper portion of the transport chain and, if desired, also below the lower portion of the transport chain. Chain wheels 18–21 are pivoted on the axles 15, between the links. These chain wheels support store chains 22–24 so that each store chain extends along one link, i.e., the store chain is mounted on two chain wheels belonging to two adjacent axles 15.

FIG. 4 shows two chain wheels 25 and 26 which are mounted on a transport chain and which support a store chain 27. A support 28 is provided below the upper portion of the store chain and is fastened to one or both of the links of the transport chain. The support prevents the upper portion of the store chain from being bent down by the articles being conveyed. Rollers 29 are mounted on the axles of the store chain, for preventing friction between the store chain and the support.

As shown in FIG. 5 separate auxiliary links 30 are mounted between the axles 31 and 32 of the transport chain, parallel with the main links of the transport chain. The auxiliary link supports a store chain 44. The axles of said store chain are provided with rollers 33 engaging the auxiliary link.

The transport chain of FIGS. 6 and 7 consist of links 34–36 interconnected by axles 43 extending through the thickened end portions of the links. Two adjacent axles are connected by one link only. The ends of the axles are provided with rollers 37 arranged to roll on stationary supports 38. The links 34–36 also act as supports for store chains 39–41, one store chain being mounted on each link, in the same way as the store chains 32 are mounted on the auxiliary links 30 in the embodiment of FIG. 5. The axles of the store chains of FIGS. 6 and 7 are provided with rollers 42 designed to roll on the links for preventing friction, as also described with reference to FIG. 5.

What is claimed is:

1. Chain conveyor, comprising at least one endless transport chain arranged for continual operation, characterized in that movable means in the form of endless smaller chains, so-called store chains, are mounted on the transport chain, said store chains being arranged to support the articles being conveyed so that said articles can be moved relative to the conveyor in its longitudinal direction, a stopping member being provided above the conveyor so that it can be placed in the way of the articles being conveyed, the articles when thus stopped being collected at the stopping member while the transport chain continues moving.

2. Chain conveyor as defined in claim 1 in which said endless transport chain consists of links connected by adjacent axles and in which one of said store chains is provided between each pair of said adjacent axles.

3. Chain conveyor as defined in claim 1 in which said endless transport chain consists of links connected by adjacent axles and in which auxiliary links extend between and are mounted on said adjacent axles and in which one of said store chains is provided between each pair of adjacent axles, said store chains being supported by said auxiliary links.

References Cited by the Examiner
UNITED STATES PATENTS

| | | | |
|---|---|---|---|
| 2,154,844 | 4/1939 | Harker et al. | 198—183 |
| 2,257,230 | 9/1941 | Drake | 198—183 |
| 2,829,762 | 4/1958 | Oswald | 198—183 |

SAMUEL F. COLEMAN, *Primary Examiner.*